(12) United States Patent
Hammond et al.

(10) Patent No.: US 7,869,899 B2
(45) Date of Patent: Jan. 11, 2011

(54) MACHINE TOOL METHOD

(75) Inventors: Peter Russell Hammond, Alnwick (GB); Anthony Brown, Alnwick (GB)

(73) Assignee: Renishaw PLC, Wotton-Under-Edge (GB)

( * ) Notice: Subject to any disclaimer, the term of this patent is extended or adjusted under 35 U.S.C. 154(b) by 865 days.

(21) Appl. No.: 11/661,363

(22) PCT Filed: Aug. 26, 2005

(86) PCT No.: PCT/GB2005/003361
§ 371 (c)(1),
(2), (4) Date: Feb. 28, 2007

(87) PCT Pub. No.: WO2006/024844
PCT Pub. Date: Mar. 9, 2006

(65) Prior Publication Data
US 2009/0112357 A1 Apr. 30, 2009

(30) Foreign Application Priority Data
Sep. 1, 2004 (GB) .................................. 0419381.9

(51) Int. Cl.
*G06F 19/00* (2006.01)
*G06F 7/38* (2006.01)
*G06G 7/22* (2006.01)

(52) U.S. Cl. ........................ 700/194; 708/442; 708/809; 700/187; 700/193

(58) Field of Classification Search ................. 700/194, 700/193, 187; 708/442, 809
See application file for complete search history.

(56) References Cited

U.S. PATENT DOCUMENTS

| | | | | |
|---|---|---|---|---|
| 2,004,018 | A * | 6/1935 | Strauss | 222/83 |
| 4,370,720 | A * | 1/1983 | Hyatt | 700/194 |
| 5,208,763 | A * | 5/1993 | Hong et al. | 702/95 |
| 6,470,587 | B1 | 10/2002 | Cunningham et al. | |
| 6,661,930 | B1 | 12/2003 | Graham et al. | |
| 6,662,071 | B1 | 12/2003 | Jackson et al. | |
| 6,681,145 | B1 | 1/2004 | Greenwood et al. | |
| 6,748,112 | B1 | 6/2004 | Nguyen et al. | |
| 6,934,601 | B2 * | 8/2005 | Hirai et al. | 700/194 |
| 2002/0016651 | A1 * | 2/2002 | Cunningham et al. | 700/302 |
| 2004/0034444 | A1 * | 2/2004 | Graham et al. | 700/186 |
| 2004/0083024 | A1 * | 4/2004 | Wang | 700/195 |
| 2004/0134275 | A1 * | 7/2004 | Reichel et al. | 73/432.1 |
| 2004/0260422 | A1 | 12/2004 | Greenwood et al. | |
| 2005/0091297 | A1 * | 4/2005 | Sato et al. | 708/442 |

* cited by examiner

*Primary Examiner*—Albert DeCady
*Assistant Examiner*—Sivalingam Sivanesan
(74) *Attorney, Agent, or Firm*—Oliff & Berridge, PLC

(57) ABSTRACT

Apparatus and method for fitting a workpiece to geometric design data of a workpiece. Nominal data points are selected from the geometric design data. Command codes are created to generate measured data points. The measurement data points have associated nominal measurement points which are used to fit the workpiece to the geometric design data. The apparatus and method may also be used to determine whether a workpiece is within tolerance and for process control.

27 Claims, 7 Drawing Sheets

MACHINE TOOL METHOD

The present invention relates to performing operations such as machining on a workpiece using apparatus, such as a machine tool or rapid manufacturing apparatus. In particular the invention relates to the use of design data to derive the command codes for the apparatus. This may be, for example, for the purposes of the alignment of tool paths or axes of the apparatus with the physical workpiece.

It is known practice to design workpieces on a CAD system which enables a 3D model of the workpiece to be built up on a computer. Data from the CAD model may be used to make the workpiece using a machine tool. However the CAD system and the machine tool each have their own coordinate systems which may have different origins and/or alignments. In order for the CAD data to be used effectively to control the machine tool, the coordinate system of the workpiece must be aligned with the machine tool and the CAD/CAM system.

Workpieces are often machined using multi-process machining. Thus when a part-machined workpiece is set up on a machine tool in order to machine some secondary features, it is important that the workpiece is correctly aligned so that the secondary features are in the correct position relative to the existing features.

It is also known to mount a measurement probe in a machine tool and thus use the machine tool to measure the features of the workpiece.

A workpiece may be aligned on a coordinate positioning apparatus simply by pushing a planar surface of the workpiece against a planar surface of the apparatus table or a part fixture mounted on the table. However this requires that the workpiece has an external planar surface and that such surfaces, whether free form or prismatic have negligible form error. Another known system of aligning a workpiece on a coordinate positioning apparatus, such as a machine tool, comprises taking measurement points with a measurement probe mounted on the coordinate positioning apparatus to find a corner of the workpiece. This typically entails taking three points on a first surface, two points on a second surface and one point on a third surface. The location of the corner of the workpiece is derived from these measurement points. The measured position of the corner is compared with the nominal position from the CAD data and the machine axes are orientated until the nominal and measured data match. However the workpiece must have a cubic corner for this method to be used, and also assumes that the faces are orthogonal and have minimal form error.

Both of these methods use the workpieces' external features to align the workpiece relative to the coordinate positioning apparatus. However if the workpiece contains critical features, it is desirable to align the workpiece from these features so that secondary features are correctly positioned relative to these critical features.

FIG. 1 illustrates another prior art method of workpiece alignment on a machine tool. In a first step CAD data of the workpiece 10 is used to determine nominal surface points 12. These could for example comprise points on the surface of a feature such as a bore. The XYZ positions of these points are determined from the CAD data within a CAD coordinate system.

In a subsequent step the workpiece is measured using a measurement probe mounted in the spindle of the machine tool. Command codes are derived 14 from the nominal surface points and the CAD data. The command codes are the machine tool command signals which drive the axes of the machine tool (e.g. spindle and/or table), movement of the probe (if an articulated probe is used) and the measurement sequence. In this step the spindle carries a measurement probe and the command codes thus drive the probe to take the measurement at the chosen inspection points. These inspection points 16 thus correspond to the nominal surface points chosen from the CAD data.

In a next step the measurement points taken by the probe are imported back into the CAD system and fitted onto the CAD model 18. As the CAD coordinate system and the machine coordinate system may not be the same, one or both of the coordinate systems must be reorientated until they are aligned 20. This may be done for example by reorientating the machine axis mathematically or by modifying the command codes.

Now that the two systems are aligned the CAD data and the inspection points may be used to create command codes 22 which are used for further machining of the workpiece.

This method has the disadvantage that as the CAD data for the workpiece is used, the method is very complex and cumbersome. It also requires CAD information at the machine tool and includes the original CAD data within the manufacturing process.

A first aspect of the invention provides a method for fitting a workpiece to geometric design data using a coordinate positioning apparatus comprising the steps of:

a) providing geometric design data of all or part of the workpiece;

b) selecting one or more nominal measurement points of the workpiece from the geometric design data;

c) creating command codes to generate one or more measured data points;

d) wherein the one or more measured data points have one or more associated nominal measurement points which are used to fit the workpiece to the geometric design data.

The nominal measurement points may be used directly or indirectly to fit the workpiece to the geometric design data.

The method may comprise the additional step of:

measuring actual measurement points on the workpiece equivalent to the nominal measurement points.

The method may include the additional step of:

comparing the actual measurement points and the one or more nominal measurement points; and reducing the error between the actual measurement points and the one or more nominal measurement points to achieve a fit within a tolerance. The fit may result in a coordinate transformation from which the coordinate system of the workpiece is aligned with the coordinate system of the coordinate positioning apparatus. The actual measurement points and the nominal measurement points may be best fitted.

The nominal measurement point data may comprise one or more of the coordinates of the nominal point and the surface normal data at the nominal point.

The actual measurement data may be stored with the nominal measurement data.

The command code may be associated with a fitting process modifier, which may comprise for example tolerance instructions, fitting instructions, rotational constraints and/or translational constraints. The process modifier may comprise a surface offset. The command code may be associated with a manufacturing process modifier, which may comprise for example tool offset instructions.

Multiple output measured data points may be associated with a single nominal measurement point.

The step of fitting the workpiece to the geometric design data may comprise fitting the actual measurement points to the nominal measurement points to determine whether the workpiece is within tolerance.

The process parameters in machining operations of subsequent workpieces may be adjusted to ensure subsequent workpieces are produced within tolerance.

The step of fitting the workpiece to the geometric design data may comprise creating a transformation matrix.

A second aspect of the invention provides a method for determining whether a workpiece is within tolerance, the method comprising the steps of:
  a) providing geometric design data of all or part of the workpiece;
  b) selecting one or more nominal measurement points of the workpiece from the geometric design data;
  c) creating command codes which are associated with the one or more nominal measurement point data;
  d) measuring actual measurement points on the workpiece equivalent to the one or more nominal measurement points;
  e) fitting the one or more actual measurement points and the one or more nominal measurement points to determine whether the workpiece is within tolerance.

A third aspect of the invention provides a method of process control in the machining of a series of workpieces, the method comprising the steps of:
  a) providing geometric design data of all or part of a first workpiece;
  b) selecting one or more nominal measurement points of the first workpiece from the geometric design data;
  c) creating command codes which are associated with nominal measurement point data;
  d) measuring one or more actual measurement points on the first workpiece equivalent to the one or more nominal measurement points;
  e) fitting the one or more actual measurement points and the one or more nominal measurement points to determine whether the workpiece is within tolerance; and
  f) adjusting the process parameters in the machining of subsequent workpieces to ensure that the subsequent workpieces are in tolerance.

A fourth aspect of the present invention provides apparatus for fitting a workpiece to geometric design data of all or part of the workpiece from which one or more nominal measurement points have been selected, the apparatus comprising a processor for carrying out the following steps:
  creating command codes to generate one or more measured data points;
  wherein the one or more measured data points have one or more associated nominal measurement points which are used to fit the workpiece to the geometric design data.

A fifth aspect of the present invention provides apparatus for determining whether a workpiece is within tolerance, the workpiece having geometric design data of all or part of the workpiece from which one or more nominal measurement points have been selected, the apparatus comprising a processor for carrying out the following steps:
  creating command codes which are associated with the one or more nominal measurement point data;
  measuring actual measurement points on the workpiece equivalent to the one or more nominal measurement points;
  fitting the one or more actual measurement points and the one or more nominal measurement points to determine whether the workpiece is within tolerance.

A sixth aspect of the present invention provides apparatus for process control in the machining of a series of workpieces, a first workpiece having geometric design data of all or part of the workpiece from which one or more nominal measurement points have been selected, the apparatus comprising a processor for carrying out the following steps:
  creating command codes with are associated with nominal measurement point data;
  measuring one or more actual measurement points on the first workpiece equivalent to the one or more nominal measurement points;
  fitting the one or more actual measurement points and the one or more nominal measurement pints to determine whether the workpiece is within tolerance; and
  adjusting the process parameters in the machining of subsequent workpieces to ensure that the subsequent workpieces are in tolerance.

In the fourth, fifth and sixth aspects, the processor may comprise for example a machine controller, an external processor such as a PC or an interface, or a combination of any of the above. The selection of the nominal data points from the geometric design data may be carried out by the processor.

For all the aspects above, the workpiece may be part machined. The workpiece may have prismatic or free form surfaces.

The present invention will now be described by way of example with reference to the accompanying drawings in which.

Figure 1:
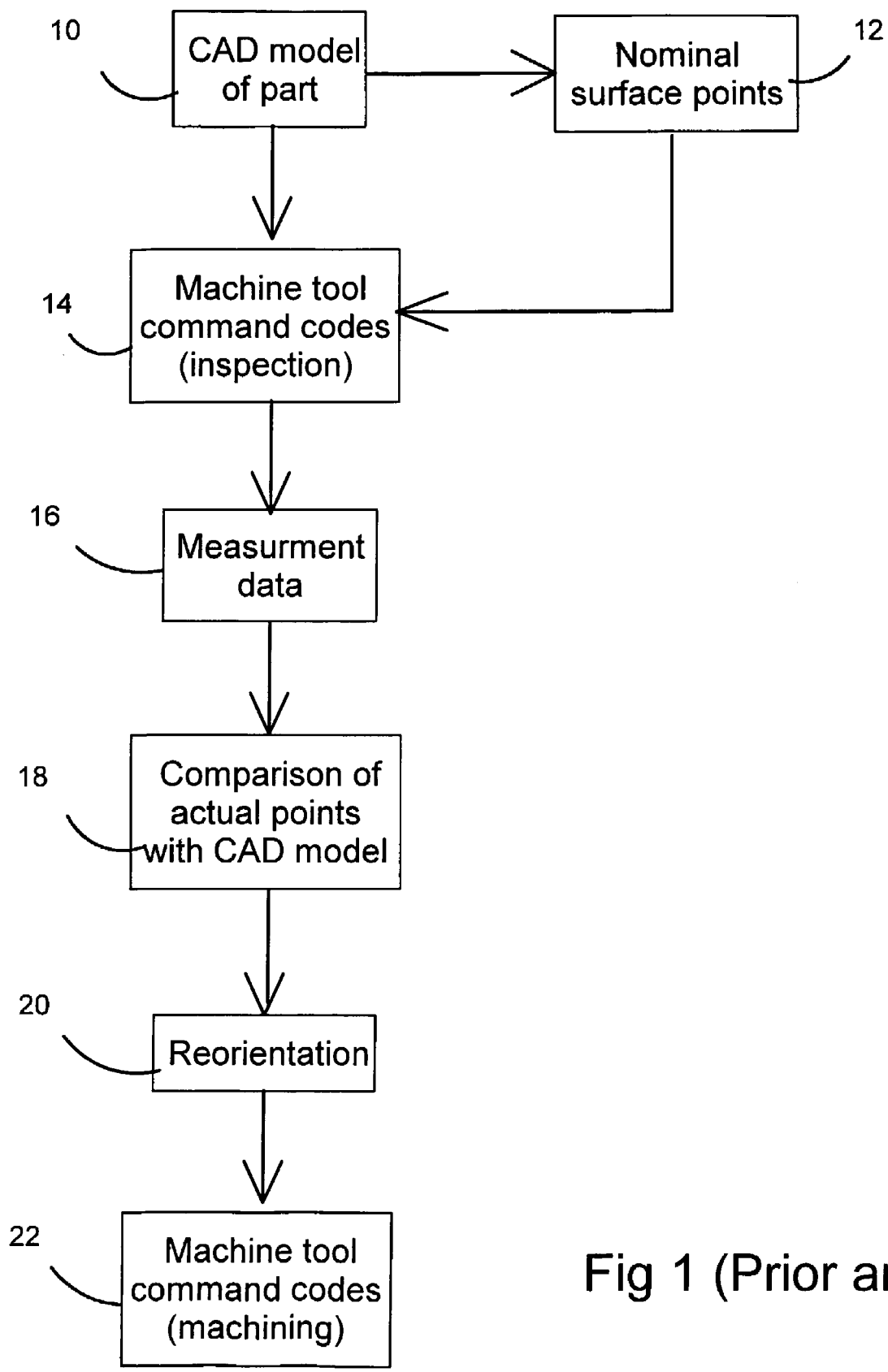
FIG. 1 is a flow diagram of prior art method.
Figure 2:
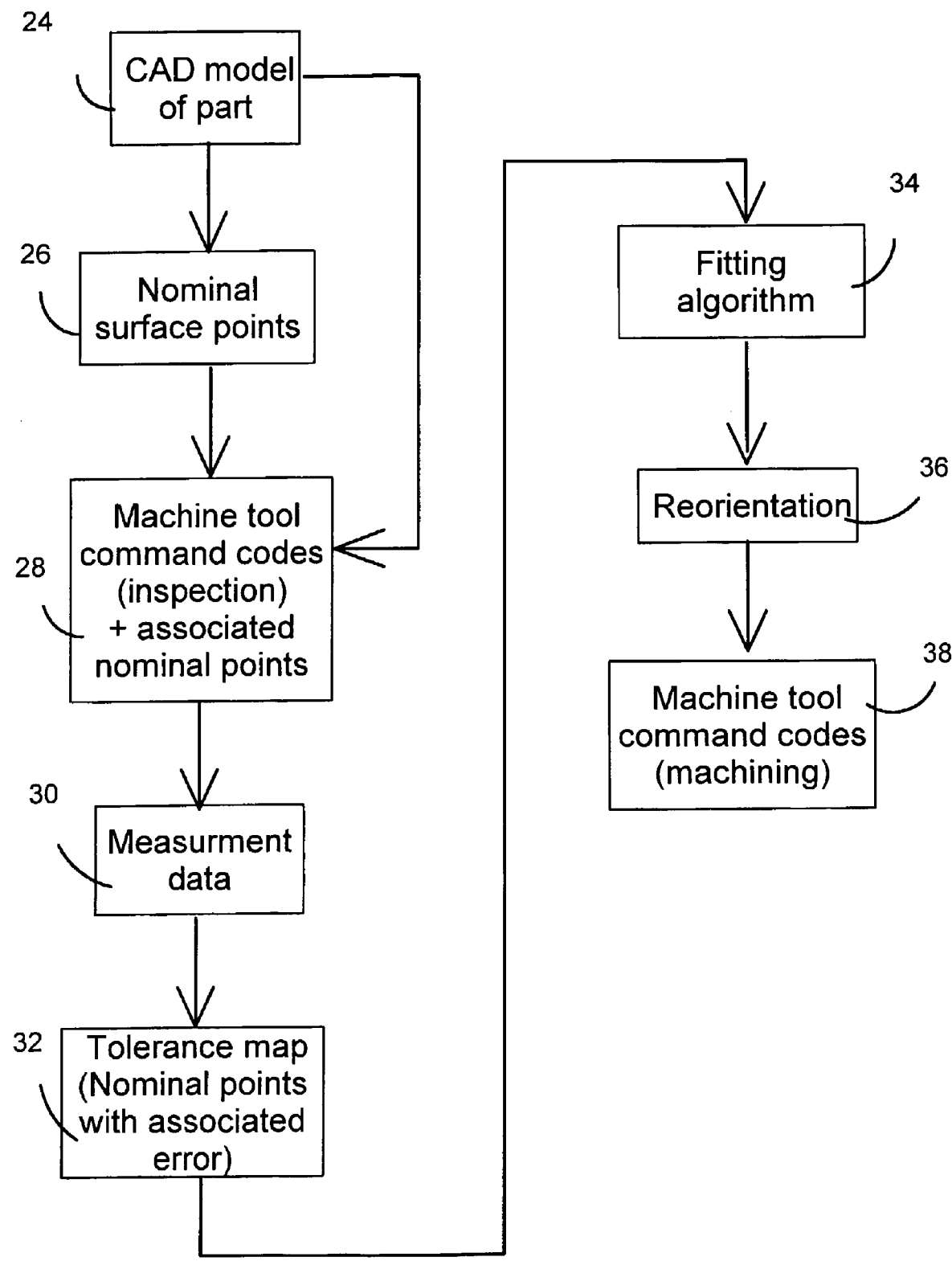
FIG. 2 is a flow diagram of the present invention.

FIG. 2 is a flow diagram illustrating the present invention. In a first step a CAD model is created for a workpiece 24. From this CAD model nominal data points are taken 26. These may for example be located on the surface of a bore. These nominal data points may be selected manually or automatically.

The machine tool has a numerically controlled program which is capable of supporting a measurement probe. The CAD model is also used to generate machine tool command codes (G codes), which will be used to inspect the workpiece with a measurement probe mounted on a machine tool 28. These command codes comprise a combination of machine moves, probe orientations and a macro containing the nominal definition of the feature being measured and the probing sequence required for measuring it. The machine tool command codes include the nominal data points. These may be embedded within the code or may be in a separate file associated with the code. Thus the command codes relate to taking measurement points at locations corresponding to the nominal data points which are included or associated with the code.

The nominal data points and the command codes may be derived from sources other than CAD data. For example, the nominal data points may be taken from drawings, measurements on high accuracy machines or equations.

A workpiece corresponding to the workpiece of the CAD model is placed on the table of the machine tool and the machine tool command codes are used to control the measurement probe mounted on the machine tool spindle to take measurement points 30 which correspond to the positions of the nominal data points on the CAD model. The actual points (taken by the measurement probe) and the nominal points are compared and form a tolerance map 32. Each nominal point in the tolerance map has an error value, determined from the actual point.

The actual points may be used directly or indirectly with the nominal point. The actual point may be used directly by taking the data from a measurement probe such as a touch trigger probe for example. The actual point may be used indirectly by including a step in which the actual point data is modified, for example by filtering the actual point data (e.g. to reduce system noise), identifying the actual point nearest the nominal point or by interpolating between two actual points to produce a point nearer the nominal point.

For prismatic geometric features, such as a circle, the feature itself may be used as a nominal point which is compared with multiple actual points. For a circle, the nominal point is at the centre and includes data relating to its coordinates, radius and orientation. This is sufficient data for comparison with actual points on the circumference of the circle. For more complex prismatic shapes more than one nominal point may be required, but the method can be achieved without a 1:1 relationship between nominal and actual points.

Figure 6:
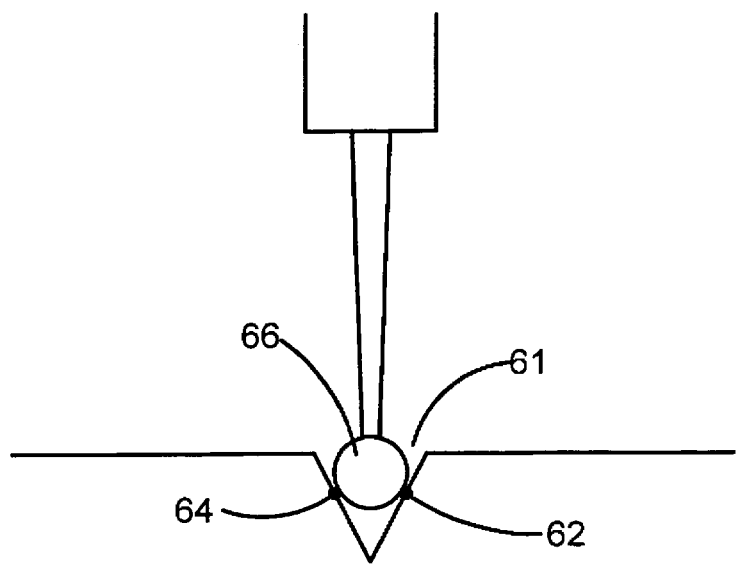
FIG. 6 illustrates a probe measuring a V-groove.

For some features (such as a corner or V-groove) several nominal measurement points may be associated with a single actual measurement point. FIG. 6 illustrates a V-groove 61 with two nominal points 62,64, one for each surface. A stylus tip 66 of a probe is shown measuring the V-groove and will collect one actual data point which relates to the two nominal points 62,64.

The external surface of the workpiece may be measured using a probe which takes either continuous or discrete measurements and may comprise for example a contact probe or a non-contact probe (e.g. capacitance, inductance or optical probe). The probe may be mounted in an articulated probe head which enables the probe head to be rotated about one or more axis relative to the machine spindle. Alternatively measurements of internal features of the workpiece may be achieved using measuring techniques such as X-ray or ultrasonic measurement.

A fitting algorithm 34 is applied to the tolerance map to optimise the error values in the map. A tolerance map is the deviation between the actual measured points and their associated nominal points. The term fitting is defined as the use of one or more points to produce a transformation so that measured data is within a required tolerance of nominal data. The fitting algorithm produces a transformation matrix which enables alignment to be achieved. The transformation may comprise rotational or translational shifts or a combination of both. This may comprise a best fit algorithm, for example a least square or Chebychev method. The fitting algorithm may reduce errors rather than minimising them. A very simple fitting technique comprises determining the difference between the coordinates of each actual measurement point and its associated nominal point. The differences are summed for all the actual measurement points and divided by the total number of points. This results in an average translation.

The fitting algorithm allows the relative realignment of the workpiece to be calculated. This may be done by reorientating the machine axes in the machine software, so that the machine axes are aligned with the workpiece or by adjusting the command codes used for subsequent steps (e.g. the cutting command codes) 36.

The command codes for subsequent steps may be adjusted to the correct orientation or command codes prepared at the location of the nominal points can be transformed to the correct orientation 38.

When the alignment process has been completed, the workpiece may be machined. This machining process may involve material removal and includes any process in which command codes are used. Examples of material removal processes suitable for use with this method include milling, grinding, forming (such as laser forming or glass forming) and electro discharge machining (EDM).

The machining process may involve addition of material in processes such as rapid prototyping and rapid manufacturing. These processes include techniques such as fused deposition modelling. Other suitable rapid manufacturing and rapid prototyping techniques include 3D printing, selective laser sintering, stereolithography and laminated object manufacturing.

The present invention is suitable for multi operation processes in which a workpiece undergoes different operations at different work centres. The workpiece must be correctly aligned at each work centre so that features created in different operations have the correct relative locations.

A first step of a multi-process machining may include moulding or other pre-forming process. In this case, the workpiece may have a free-form surface and thus the prior art method of aligning planar surfaces or probing corners will not be suitable. Additional machining may be required to add features which must be in a correct location relative to the form of the surface. This method is suitable for use on initial workpiece set-up as described below. A workpiece requiring additional machining is first located on the table of the machine tool. The workpiece may be positioned approximately on the table of the machine tool and fixed using clamps. A first probing sequence may be used to establish the initial workpiece set-up. For example two measurement points may be used to determine the position of the side of the workpiece and three measurement points may be used to determine the position of a corner of the workpiece. The above process of reorientating the machine tool axes may be used using nominal and actual workpiece data on the surface of the workpiece. This process enables good clean up of the workpiece and accurate machining of the initial features.

This is suitable for workpieces such as moulded carbon fibre car bodies, into which subsequent features are to be machined at a specific location.

The method is also suitable for secondary machining operations. In a first machining operation, a feature such as a bore is machined into the workpiece. The inspection sequence described above is carried out. As before nominal and actual workpiece data of the machined feature (bore) are used to generate a tolerance map. This is used to reorient the machine tool axes or the command codes. The machine tool axes now match the workpiece axes and further secondary features may be machined in the correct relative position. Thus the secondary feature is machined correctly independently of the initial workpiece set-up. This has the advantage that the secondary feature is aligned to the critical feature (in this case a bore) rather than the external surface.

By using measurements of a workpiece taken by the machine tool to calculate realignment of the workpiece, subsequent operations are optimised.

This method is suitable in turbine blade refurbishment. Worn turbine blades may be refurbished by applying weld to the worn area and then machining the welded area, particularly around the weld joint, to remove excess material. Alternatively, the worn part of the blade may be built up using a rapid manufacturing technique. In both these cases, alignment of the turbine blade must be established so that the subsequent steps may be performed in the correct location so that the refurbished blade is within tolerance. This technique enables this alignment.

This method has the advantage that the CAD model is not required for the reorientation of the machine tool axes or the command code. As only nominal data points from the CAD model are used much less software is required. Furthermore this method is suitable for being automated.

The command codes comprise the movement instruction (e.g. for a measurement or cutting routine) and as described above have nominal data points associated with them. The nominal data points may include the coordinates of the nominal point, the surface normal at the nominal point and other characteristics of the nominal point, such as the orientation of the surface at that point and whether that point is located on a plane surface or an edge etc.

Figure 3:
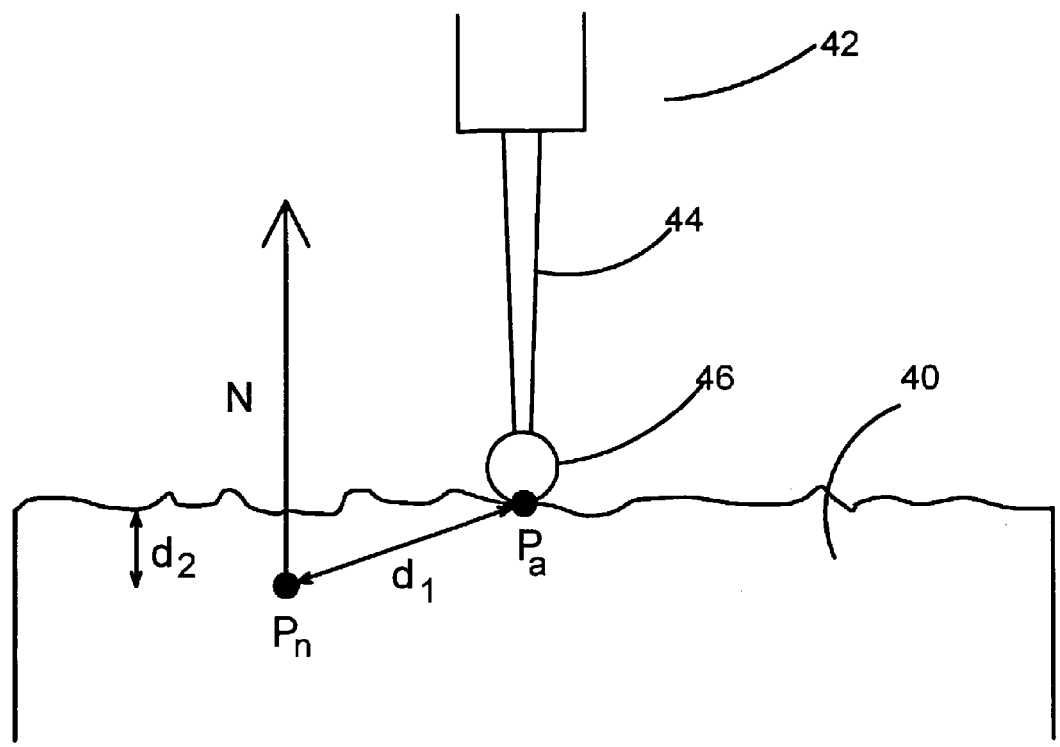
FIG. 3 illustrates a workpiece being measured by a measurement probe.

FIG. 3 illustrates a workpiece 40 being measured by a probe 42. The probe 42 has a deflectable stylus 44 with a stylus tip 46 which is in contact with the surface of the workpiece 40. A nominal data point $P_n$ is shown which has been derived from design data such as a CAD drawing. An actual data point $P_a$ is shown, which is the measured point which corresponds to the nominal data point $P_n$. The distance between the actual data point $P_a$ and the nominal data point $P_n$ is $d_1$.

However the distance between the nominal data point $P_n$ and the surface parallel to the direction of the surface normal N is $d_2$, which is smaller than $d_1$. Either $d_1$ or $d_2$ may be used in this method.

Figure 4:
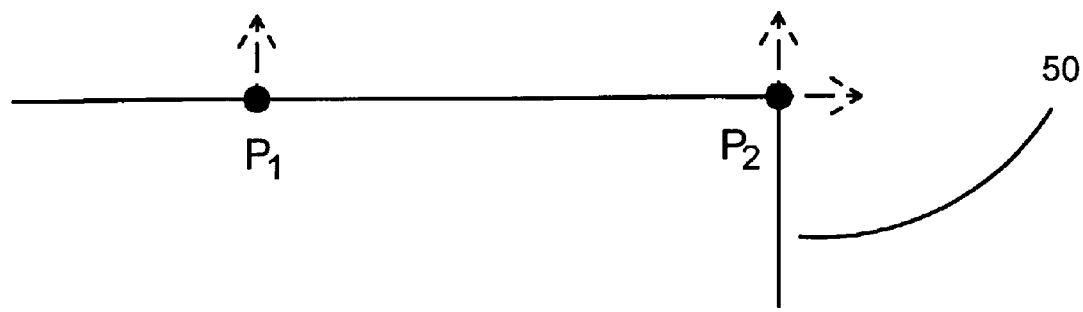
FIG. 4 illustrates a part of a workpiece highlighting points in a planar surface and edge.

FIG. 4 illustrates a workpiece 50 with nominal data points $P_1$ and $P_2$, located on a plane surface and an edge respectively. The nominal data for each point may contain information which identifies these different features.

When the workpiece has been measured, actual part data is stored together with the nominal part data. These two sets of data are fitted as previously described. These data sets may also be used to determine whether a workpiece is within tolerance and to adjust subsequent cutting routines.

The command codes may have other data associated with them. Such data includes fitting process modifiers, such as the tolerance or fitting instructions, orientation constraints (e.g. restricting linear and/or rotational transformations) and machining process modifiers, such as tool offsets. These enable the method to be used to determine if a workpiece is within tolerance or to control subsequent processes. The process modifier may also comprise a surface offset. The nominal points derived from the CAD data may relate to the post machined state whereas the workpiece is unmachined and thus larger. Therefore a surface offset is required to take this difference into account.

The command codes may incorporate command code macros.

Figure 7:
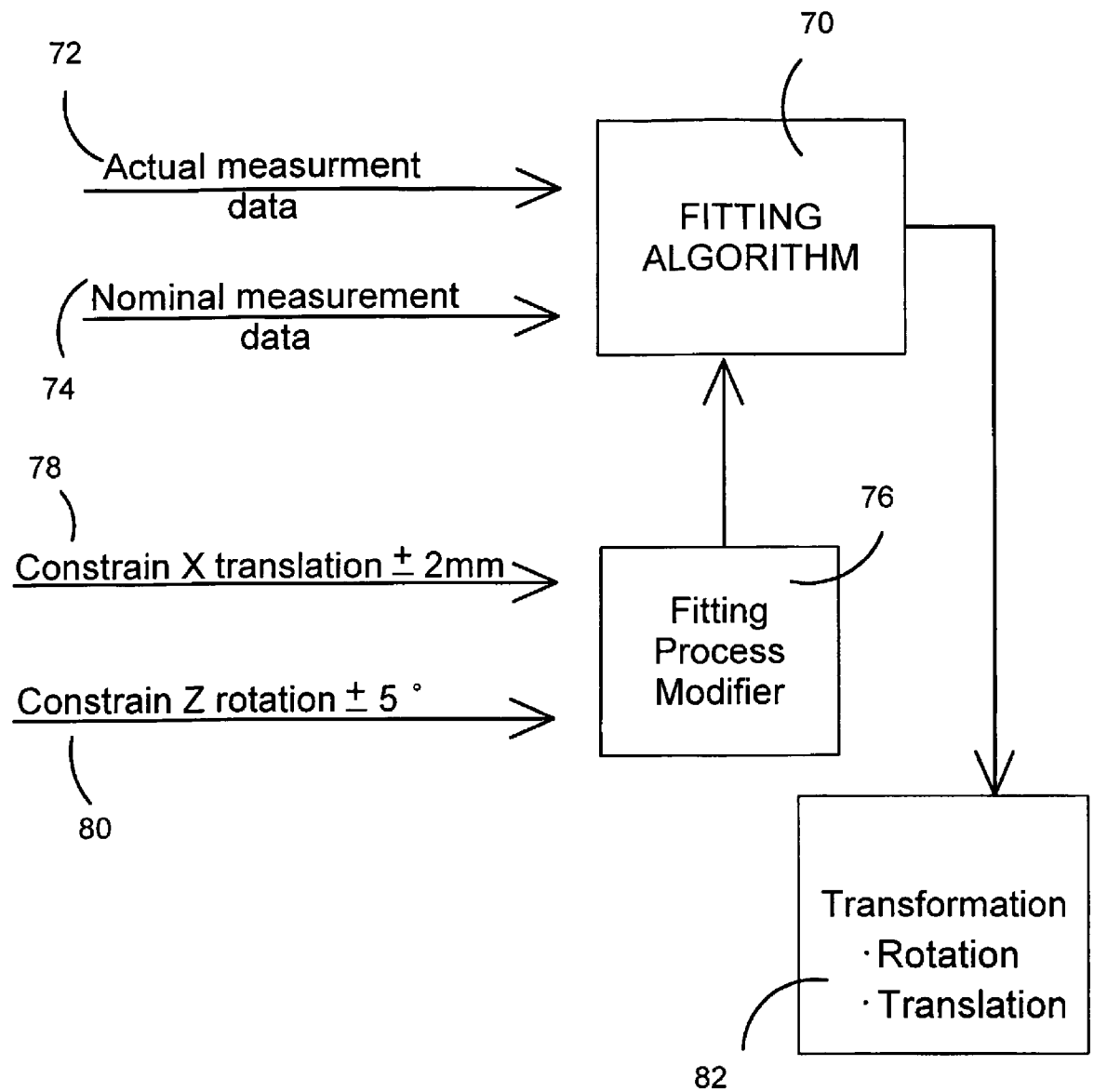
FIG. 7 is a schematic illustration showing the relationship between the fitting algorithm and a fitting process modifier.

FIG. 7 is a schematic diagram illustrating the relationship between the fitting algorithm and the fitting process modifier. The fitting algorithm 70 receives inputs from the actual measurement data 72 and the nominal measurement data 74. It also receives an input from the fitting process modifier 76. This may include constraints to the fitting algorithm such as a constraint in X translation 78 or Z rotation 80. The output of the fitting algorithm is a transformation 82 which may comprise a combination of rotations and translations.

Figure 8:
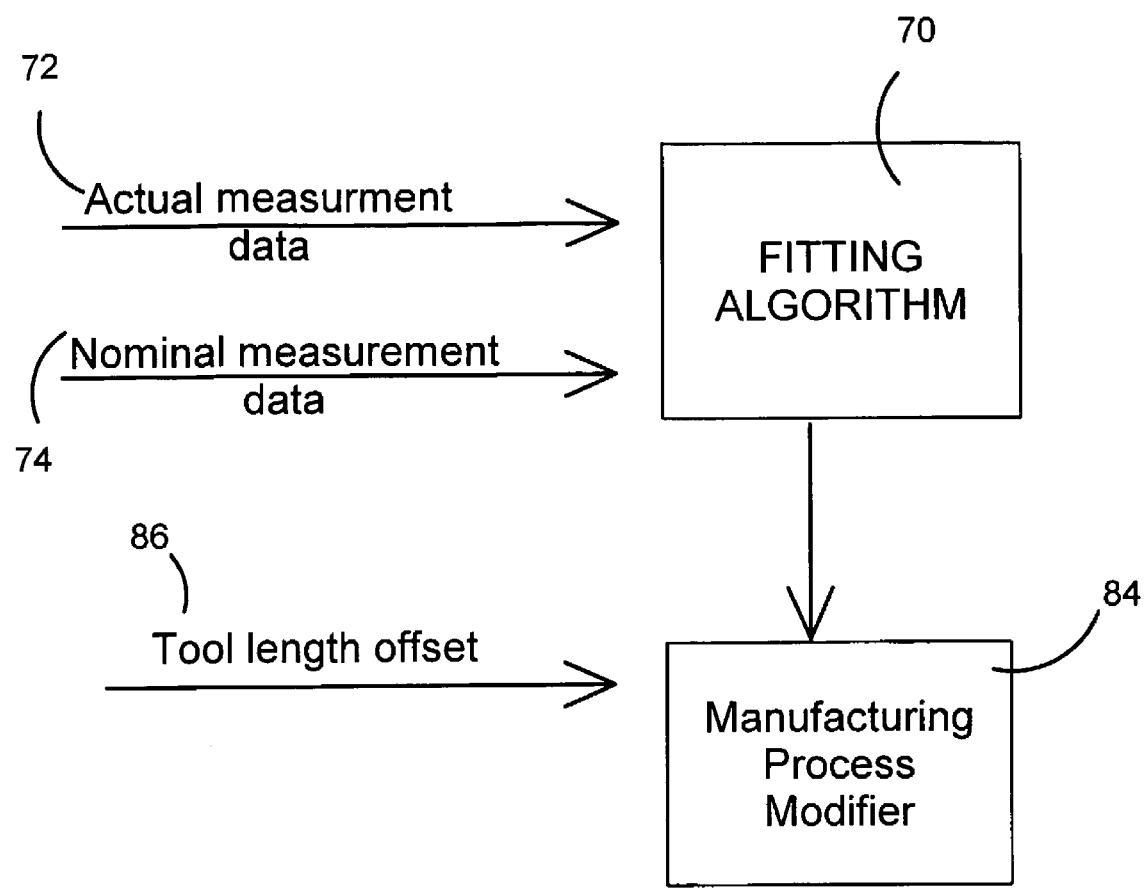
FIG. 8 is a schematic illustration showing the relationship between the fitting algorithm and a manufacturing process modifier.

FIG. 8 is a schematic diagram illustrating the relationship between the fitting algorithm and the manufacturing process modifier. As before, the fitting algorithm 70 receives inputs from the actual measurement data 72 and the nominal measurement data 74. The fitting algorithm 70 sends an output to a manufacturing process modifier 84, which may include options such as a tool length offset 86. The output from the fitting algorithm 70 may cause the manufacturing process modifier 84 to be adjusted (e.g. by adjusting the tool length offset 86).

Figure 5:
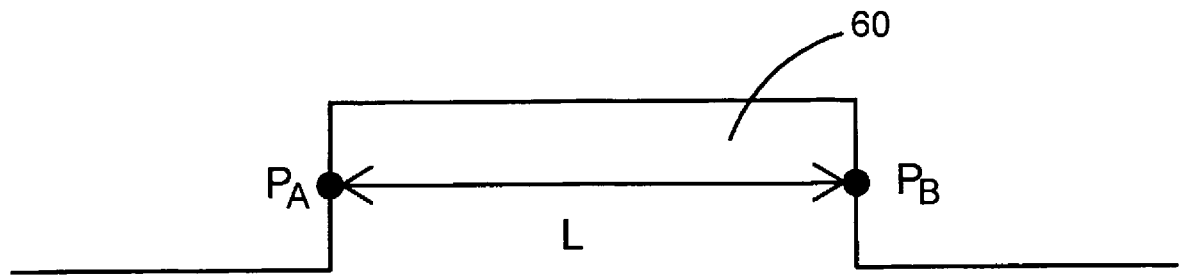
FIG. 5 illustrates a boss of a workpiece.

FIG. 5 illustrates a boss 60 of a workpiece. Conventional techniques for determining whether the boss is in tolerance comprise measuring the distance L and comparing this with an acceptable range. (Such conventional techniques include the use of a micrometer or Vernier calliper.) However this method only checks the size of the boss but does not check the position or form of the boss.

In the present method, nominal data points $P_A$, $P_B$ are derived from design data as previously described. The command codes which control the measurement path are associated with the nominal data and tolerance instructions. When the part is measured, the difference between the actual data and nominal data is compared with the tolerance instructions (for each point), thus enabling it to be determined if the part is with tolerance. This gives information about the position as well as the size of a feature.

The tolerance data may be used in a process control step, in which the tolerance data is used as feedback to control the cutting command codes for the machining of subsequent parts.

Macros associated with the command codes may adjust the tool cutting path or the tool offset. The cutting offset may be adjusted by applying the average difference between the nominal and actual data to the cutting offset and adjusting the offset accordingly.

The computation between nominal and actual part data is carried out in a processor and may be done directly on the machine controller or indirectly on a separate computer, (in which case it may be sent via disc, radio or optical transmission or cable etc). In the latter case, the nominal and actual data may be exported from the controller to the computer together or by separate routes. For example, the actual data may be sent to the computer one measurement at a time, where the nominal data may be already stored.

Figure 9:
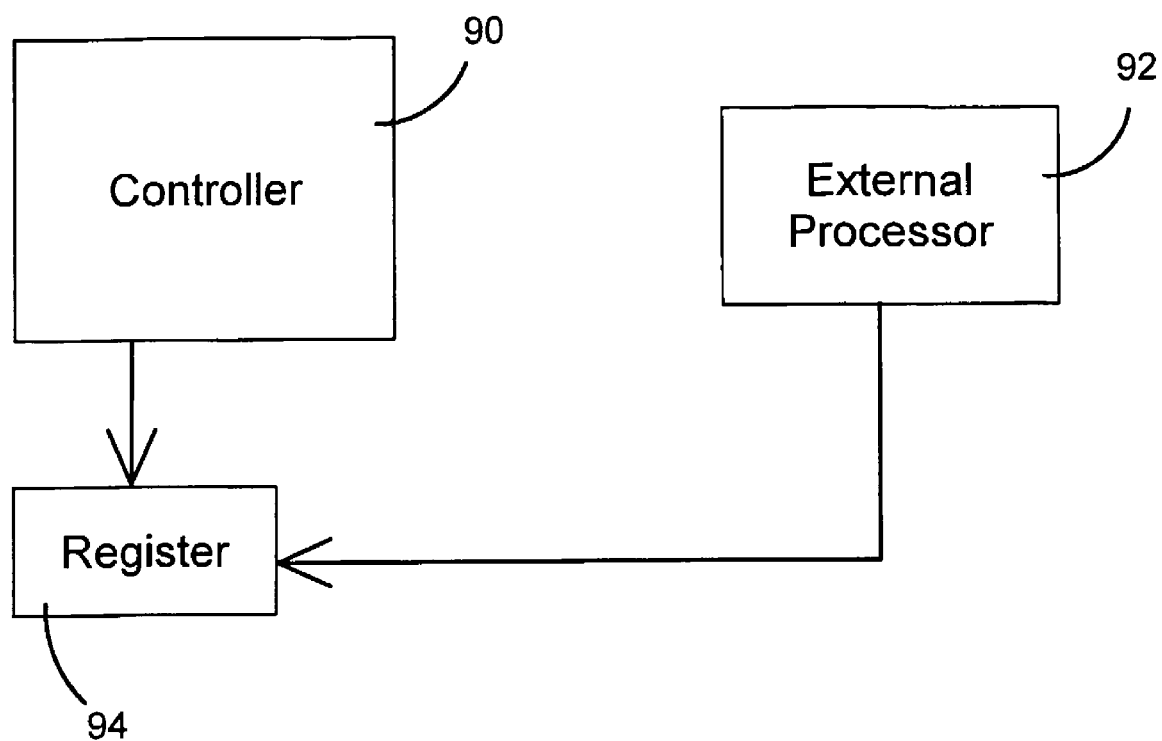
FIG. 9 illustrates the relationship between a controller and external processor.

The method is carried out by a processor which may comprise a controller associated with the apparatus (e.g. machine tool controller) and a separate external processor (e.g. PC) with a high speed serial link between them. FIG. 9 illustrates a controller 90 and external processor 92.

The controller 90 stores the actual and nominal data as variables in a register 94 which is readable by the external processor 92. The controller 90 may send a signal to the external processor 92 to indicate that data is available in the register 94. One method of doing this comprises defining a special register which indicates whether there is new data available. For example, a zero may indicate that no new data is available whilst 1 may indicate that new data is available. The controller may send a signal to the external processor by other means, for example optical or radio transmission.

The external processor 92 may be used to carry out calculations relating to fitting the data etc.

The invention claimed is:

1. A method for fitting a workpiece to geometric design data using a coordinate positioning apparatus comprising:
    a) providing geometric design data of all or part of the workpiece;
    b) selecting one or more nominal measurement points of the workpiece from the geometric design data;
    c) creating command codes to drive the coordinate positioning apparatus to generate one or more measured data points, wherein the one or more measured data points have one or more associated nominal measurement points;
    d) fitting the one or more measured data points and the one or more associated nominal measurement points, separately from the rest of the geometric design data, thereby to fit the workpiece to the geometric design data.

2. A method according to claim 1, wherein the nominal measurement points are used directly to fit the workpiece to the geometric design data.

3. A method according to claim 1 wherein the nominal measurement points are used indirectly to fit the workpiece to the geometric design data.

4. A method according to claim 1, further comprising:
measuring actual measurement points on the workpiece equivalent to the nominal measurement points.

5. A method according to claim 1 further comprising:
comparing the actual measurement points and the one or more nominal measurement points; and
reducing the error between the actual measurement points and the one or more nominal measurement points to achieve a fit within a tolerance.

6. A method according to claim 5 wherein the fit results in a coordinate transformation from which the coordinate system of the workpiece is aligned with the coordinate system of the coordinate positioning apparatus.

7. A method according to claim 5 wherein the actual measurement points and the nominal measurement points are best fitted.

8. A method according to claim 1 wherein the nominal measurement point data comprises the coordinates of the nominal point.

9. A method according to claim 1 wherein the nominal measurement point data comprises the surface normal data at the nominal point.

10. A method according to claim 1 wherein the actual measurement data is stored with the nominal measurement data.

11. A method according to claim 1 wherein the command code is associated with a fitting process modifier.

12. A method according to claim 11 wherein the fitting process modifier comprises tolerance instructions.

13. A method according to claim 11 wherein the fitting process modifier comprises fitting instructions.

14. A method according to claim 11 wherein the fitting process modifier comprises rotational constraints.

15. A method according to claim 11 wherein the fitting process modifier comprises translational constraints.

16. A method according to claim 11 wherein the process modifier comprises a surface offset.

17. A method according to claim 1 wherein the command code is associated with a manufacturing process modifier.

18. A method according to claim 17 wherein the manufacturing process modifier comprises tool offset instructions.

19. A method according to claim 1 wherein multiple output measured data points are associated with a single nominal measurement point.

20. A method according to claim 1 fitting the workpiece to the geometric design data comprises fitting the actual measurement points to the nominal measurement points to determine whether the workpiece is within tolerance.

21. A method according to claim 1 wherein the process parameters in machining operations of subsequent workpieces are adjusted to ensure subsequent workpieces are produced within tolerance.

22. A method according to claim 1, wherein fitting the workpiece to the geometric design data comprises creating a transformation matrix.

23. A method for determining whether a workpiece is within tolerance, the method comprising:
a) providing geometric design data of all or part of the workpiece;
b) selecting one or more nominal measurement points of the workpiece from the geometric design data;
c) creating command codes which are associated with the one or more nominal measurement point data;
d) using the command codes, measuring actual measurement points on the workpiece equivalent to the one or more nominal measurement points;
e) fitting the one or more actual measurement points and the one or more nominal measurement points, separately from the rest of the geometric design data, to determine whether the workpiece is within tolerance.

24. A method of process control in the machining of a series of workpieces, the method comprising:
a) providing geometric design data of all or part of a first workpiece;
b) selecting one or more nominal measurement points of the first workpiece from the geometric design data;
c) creating command codes which are associated with nominal measurement point data;
d) using the command codes, measuring one or more actual measurement points on the first workpiece equivalent to the one or more nominal measurement points;
e) fitting the one or more actual measurement points and the one or more nominal measurement points, separately from the rest of the geometric design data, to determine whether the workpiece is within tolerance; and
f) adjusting the process parameters in the machining of subsequent workpieces to ensure that the subsequent workpieces are in tolerance.

25. Apparatus for fitting a workpiece to geometric design data of all or part of the workpiece from which one or more nominal measurement points have been selected, the apparatus comprising a processor configured for:
creating command codes to drive the coordinate positioning apparatus to generate one or more
measured data points, wherein the one or more measured data points have one or more associated nominal measurement points;
fitting the one or more measured data points and the one or more associated nominal measurement points, separately from the rest of the geometric design data, thereby to fit the workpiece to the geometric design data.

26. Apparatus for determining whether a workpiece is within tolerance, the workpiece having geometric design data of all or part of the workpiece from which one or more nominal measurement points have been selected, the apparatus comprising a processor configured for:
creating command codes which are associated with the one or more nominal measurement point data;
using the command codes, measuring actual measurement points on the workpiece equivalent to the one or more nominal measurement points;
fitting the one or more actual measurement points and the one or more nominal measurement points, separately from the rest of the geometric design data, to determine whether the workpiece is within tolerance.

27. Apparatus for process control in the machining of a series of workpieces, a first workpiece having geometric design data of all or part of the workpiece from which one or more nominal measurement points have been selected, the apparatus comprising a processor configured for:
creating command codes with are associated with nominal measurement point data;
using the command codes, measuring one or more actual measurement points on the first workpiece equivalent to the one or more nominal measurement points;
fitting the one or more actual measurement points and the one or more nominal measurement points, separately from the rest of the geometric design data, to determine whether the workpiece is within tolerance; and
adjusting the process parameters in the machining of subsequent workpieces to ensure that the subsequent workpieces are in tolerance.

* * * * *